United States Patent [19]

Schaller

[11] Patent Number: 4,544,803

[45] Date of Patent: Oct. 1, 1985

[54] POSITIONAL TRANSDUCER

[75] Inventor: George E. Schaller, Denville, N.J.

[73] Assignee: Ceramic Magnetics, Inc., Fairfield, N.J.

[21] Appl. No.: 619,544

[22] Filed: Jun. 11, 1984

[51] Int. Cl.[4] ..................... G08C 21/00; H01F 21/06
[52] U.S. Cl. ......................................... 178/18; 178/19; 336/110; 336/135
[58] Field of Search ............... 178/18, 19; 340/365 R, 340/365 L, 709; 74/471 XY, 495, 502; 336/110, 135

[56] References Cited

U.S. PATENT DOCUMENTS

| | | | |
|---|---|---|---|
| 4,161,726 | 7/1979 | Burson | 340/365 R |
| 4,320,392 | 3/1982 | Giovinazzo | 340/365 C |
| 4,375,631 | 3/1983 | Goldberg | 338/128 |
| 4,434,412 | 2/1984 | Ruumpol | 336/135 |

OTHER PUBLICATIONS

IBM Technical Disclosure Bulletin, vol. 23, No. 8–Jan., 1981, Keyboard Scanned Capacitive Joy Stick Cursor Control, J. E. Fox, p. 3831.

*Primary Examiner*—Stafford D. Schreyer
*Attorney, Agent, or Firm*—Amster, Rothstein & Engelberg

[57] ABSTRACT

A positional transducer includes a nonconductive plate having four ferrite tube inductors mounted at preselected locations in the plate. Two interconnected permanent magnets are mounted on either side of the plate with opposite poles facing the plate for magnetic interaction. Manual movement of the permanent magnets varies the impedance of the inductors to indicate the relative position of the magnets to the inductors.

2 Claims, 7 Drawing Figures

FIG. 4.
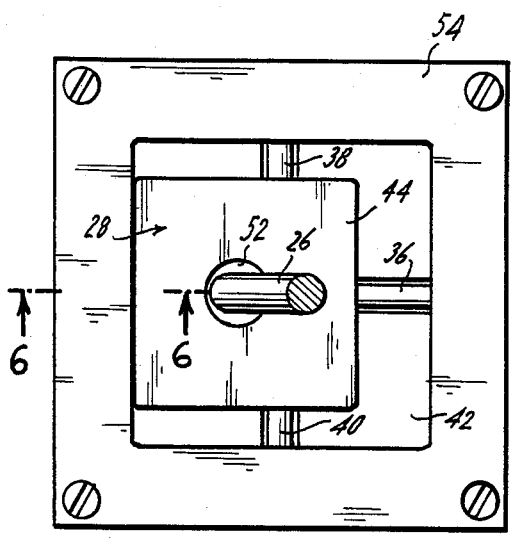
FIG. 5.
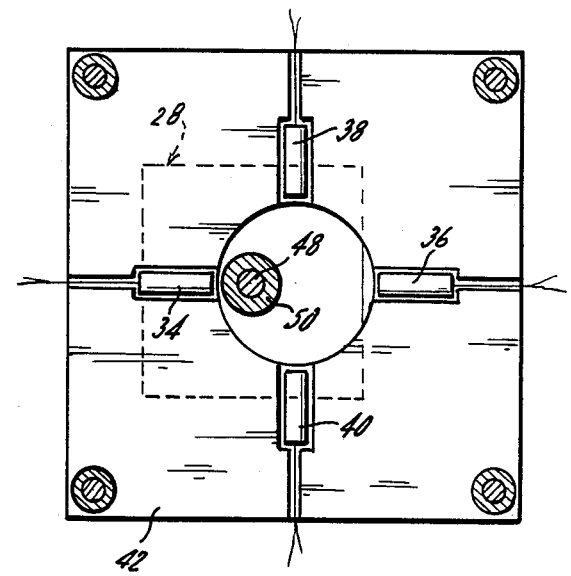
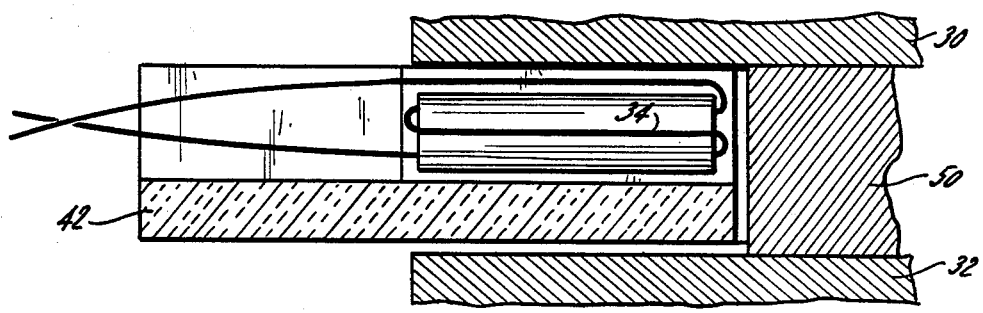
FIG. 6.
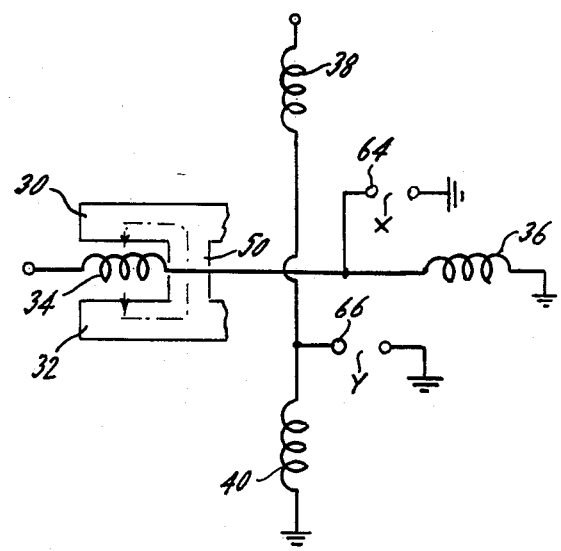
FIG. 7.

POSITIONAL TRANSDUCER

BACKGROUND OF THE INVENTION

The present invention relates to a positional transducer, otherwise known as a joystick, which can be used for a variety of applications including video amusement games, positioning of a cursor on a graphic display, operation of a robot in a remote location, operation of construction equipment in an adverse environment, or in general, the electronic control of any device along orthogonal coordinates.

Traditional control of movement along orthogonal coordinates relied upon four separate controls which functioned to control motion in the +X, −X, +Y and −Y directions. However, with the use of a single control, positional movement can be obtained quicker and easier than by using four distinct controls. A single control allows for angular movement in the plane of the orthogonal coordinates rather than just movement only along the X axis or Y axis. Positional transducers are well-known in the prior art and are disclosed, for example, in U.S. Pat. No. 4,161,726, U.S. Pat. No. 4,320,392, U.S. Pat. No. 4,375,631 and IBM Technical Disclosure Bulletin, Volume 23, No. 8 of January, 1981.

With positional transducers being used more frequently for everything from video games to cursor controls on video displays and the remote operation of robots and construction equipment, it is advantageous to have a simple, inexpensive, reliable and accurate positional transducer with as few moving parts as possible so that the accurate control of equipment will not degrade over time due to wear or adverse operating conditions. Since they rely upon mechanical connections to effect electrical contact, the positional transducers shown in the prior art, such as that shown in U.S. Pat. No. 4,375,631, U.S. Pat. No. 4,161,726 and IBM Technical Disclosure Bulletin, Volume 23, No. 8 of January, 1981 are sensitive to dirt and their effective use will degrade over long term use in adverse environments, such as outdoors at construction sites.

It is an object of this invention to overcome these problems and disadvantages in the prior art. In particular, it is a general object of this invention to provide an improved positional transducer.

It is a specific object of the present invention to provide a sensitive, highly reliable positional transducer that does not rely upon mechanical connections to effect electrical contact.

It is a more specific object of the present invention to provide a positional transducer that can be used in hostile environments without any degradation in performance over time.

It is a further object of the present invention to provide a positional transducer whereby control is provided by permanent magnets which are selectively positional around permanently fixed ferrite tube inductors.

BRIEF DESCRIPTION OF THE INVENTION

These and other objects are accomplished in accordance with the present invention by a positional transducer having a joystick type control arm which is used to vary the relative position of the sensing elements of a position sensor from which an output signal is obtained indicative of the relative position of the sensing elements. The output signal can be displayed or used to control the position of equipment or other devices to which the output signal is applied.

In one embodiment of the invention, the position sensor comprises two permanent magnets which are mounted on opposite sides of a nonconductive plate with opposite poles of the magnets facing the plate and in magnetic interaction with each other and magnetic sensors, preferably composed of ferrite tube inductors, installed in the nonconductive plate at preselected locations relative to the orthogonal axis of the plate. Movement of the magnets relative to the ferrite sensors causes a change in the impedance of the sensors and a cooresponding voltage drop across them. The change in voltage drop across the sensors creates an output signal which can be used for controlling machinery, equipment and the like or displayed to indicate position.

In a specific embodiment of the present invention, four ferrite tube inductors are positioned 90° apart in a nonconductive plate, forming orthogonal coordinates. The permanent magnets are mounted on opposite sides of the plate and jointly moved relative to the nonconductive plate. The two ferrite tube inductors in the X axis are electrically connected together and biased with a voltage of 10 volts AC. The two inductors on the Y axis are similarly connected and biased with a voltage of (b 10 volts AC. Movement of the permanent magnets relative to the inductors changes the relative impedance of the inductors, thereby changing the voltage drops across the inductors. For example, if the magnets are moved along the X axis in the −X direction, the impedence of the −X inductor increases relative to the impedance of the +X inductor causing the voltage across the −X inductor to increase relative to the voltage across the +X inductor. The analog signal thus produced is outputed for functional use and converted into a digital signal so that the position of the magnets can be displayed on the digital display.

These and other objects of the invention will become more apparent to a worker skilled in the art upon reading the following detailed description taken in conjunction with the drawings, of which:

FIG. 4 is a top cutaway view taken along line 4—4 of FIG. 3 showing the nonconductive plate with the installed ferrit tube inductors and the permanent magnets;

FIG. 5 is a top cutaway view taken along line 5—5 of FIG. 3, showing the noncondutive plate, the ferrite tube inductors and the bottom permanent magnet;

FIG. 6 is a side section view of one ferrite tube inductor taken along line 6—6 of FIG. 4; and, FIG. 7 is a schematic drawing of the four ferrite tube inductors.

Figure 1:
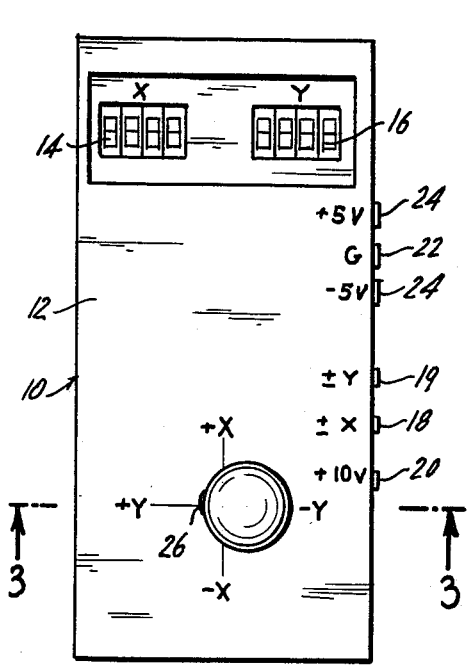
FIG. 1 is a top view of the outside of the positional transducer.

Referring to FIG. 1, positional transducer 10 includes a housing 12, digital display 14 to indicate position along the X axis, digital display 16 to indicate position along the Y axis, analog signal output terminals 18 and 19, input voltage terminal 20, ground terminal 22, input voltage terminals 24 and control arm 26.

Figure 3:
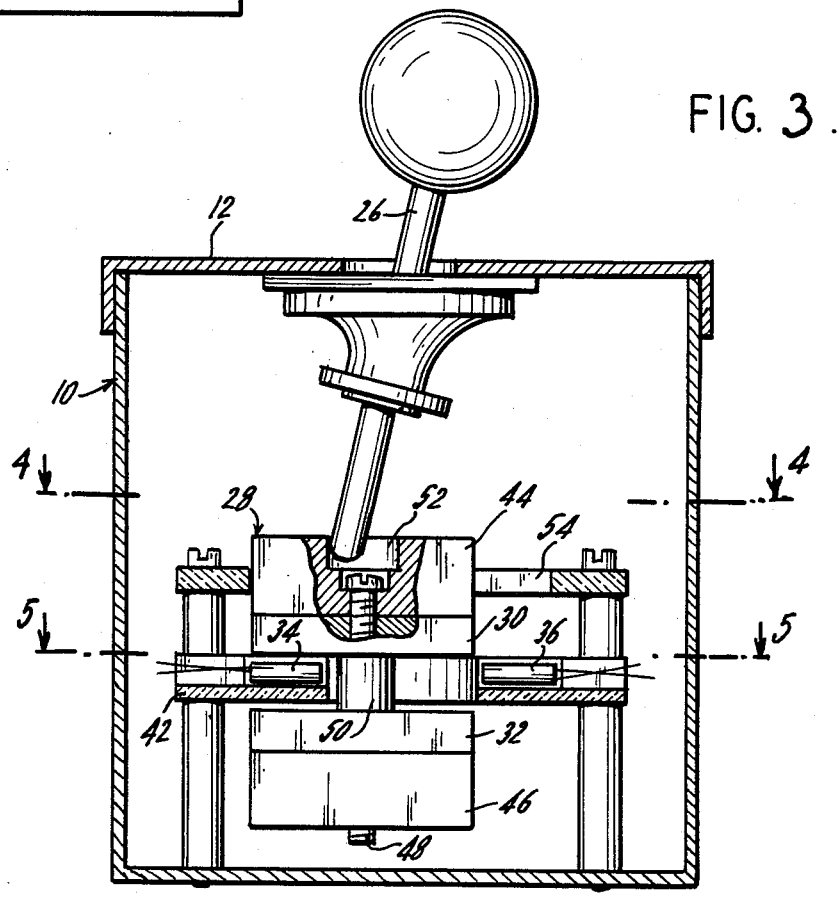
FIG. 3 is a side sectional view taken along line 3—3 of FIG. 1, showing the mechanical portion of the positional transducer.

Referring now to FIG. 3, positional transducer 10 further includes position sensor 28 which comprises permanent magnets 30 and 32 positioned on opposite sides of non-conductive plate 42 in which ferrite tube inductors 34, 36, 38 and 40 (see, FIG. 5) are mounted. Permanent magnets 30 and 32 are held in place by end caps 44 and 46 which are held together by bolt 48 and spaced a fixed distance apart by sleeve 50, which is made of soft iron. Magnets 30 and 32 are mounted so that opposite poles face plate 42 and are spaced at a distance so that they are in magnetic interaction with each other. Control arm 26 loosely fits into indent 52 of end cap 44. Template 54 (FIG. 4) limits the allowable movement of magnets 30 and 32 about plate 42.

Referring now to FIGS. 5 and 6, inductors 34, 36, 38 and 40 are mounted in plate 42, along the −X, +X, +Y and −Y coordinates. Inductor 34 is electrically connected to inductor 36, the two inductors interacting to determine the relative position along the X axis. Inductor 38 and inductor 40 are electrically connected and operate to determine the relative position along the Y axis.

Referring now to FIGS. 2-7, positional transducer 10 operates by manual movement of control arm 26 to position permanent magnets 30 and 32 relative to inductors 34, 36, 38 and 40, thereby saturating with magnetic flux the portion of those inductors between which permanent magnets 30 and 32 are positioned and causing a change in impedance in the ferrite tube inductors. The more area that permanent magnets 30 and 32 surround of an inductor, the greater the impedance of that inductor, causing a greater voltage drop across that inductor. Changes in voltage in an inductor creates an output signal, dependent upon the position of control arm 26, which is converted by electronic means 56, 58 into an analog signal and by second electronic means 60, 62 into a digital signal for displaying the position on digital displays 14, 16. Second electronic means 60, 62 requires an operational voltage of 5 volts which is inputed into positional transducer 10 at terminals 24 (FIG. 1).

Figure 2:
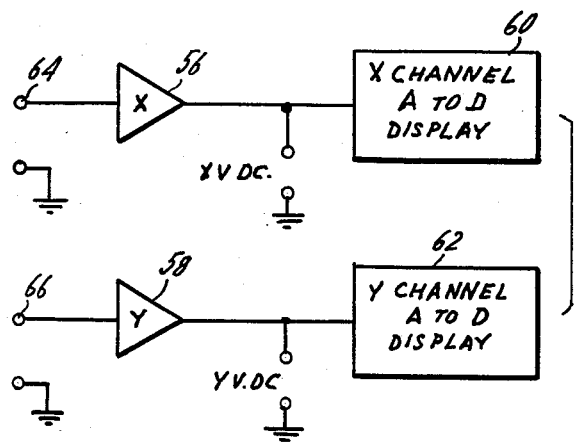
FIG. 2 is a block diagram of the electronic circuitry of the positional transducer.

For example, referring to FIGS. 2, 4 and 7, permanent magnets 30 and 32 are shown (see, FIG. 4 and 7) having been moved along the −X axis substantially covering inductor 34, thereby saturating inductor 34 with magnetic flux and increasing the impedance in inductor 34. When the impedance in an inductor is increased, the voltage drop across that inductor is correspondingly increased. Thus, the increase voltage drop across inductor 34 will cause a change in voltage and an output signal at terminal 64, which signal is fed to electronic means 56, such as an operational amplifer which converts the output signal into an analog signal. This analog signal which is representative of the position of control arm 26 along the −X axis, is outputed to terminal 18 (FIG. 1) where it can be functionally used for control of a robot, construction equipment, positioning of a cursor on a video display and the like. The analog signal from electronic means 56 is also fed into second electronic means 60 where the signal is converted from an analog type into a digital signal and displayed on digital display 14. Since the position of control arm 26 along the Y axis is zero, no output signal is produced at terminal 66. Likewise, movement of control arm 26 along the Y axis causes magnets 30 and 32 to move along the axis formed by inductors 38 and 40 creating a change in the voltage and thus an output signal at terminal 66, which signal is fed into electronic means 58, such as an operational amplifier which converts the output signal into an analog signal. This analog signal is outputed to terminal 19 where is can be, likewise, functionally used for the control of robots, etc. The analog signal from electronic means 58 is also fed into second electronic means 62 where the signal is converted from an analog type to a digital type signal for display on digital display 16.

While what has been described is the presently preferred embodiment of the invention, it will be apparent to those skilled in the art that modifications and changes can be made to the invention while keeping within the spirit and scope thereof which is set forth in the appended claims.

I claim:

1. A positional transducer comprising a nonconductive plate, position sensor means including at least two permanent magnets mounted on opposite sides of said plate for movement relative to said plate with the opposite poles of said magnets in magnetic interaction and sensor means mounted at preselected locations relative to said plate to be affected by the magnetic field produced by said permanent magnets, means functionally engaging said magnets to vary the position of said magnets relative to said sensor means to control the relative amount of magnetic flux reaching each sensor means in dependence upon the relative position of the permanent magnets to such sensor means and means coupled to said sensor means for producing at least one output signal indicative of the relative position of the magnets relative to said sensor means.

2. A positional transducer comprising a nonconductive plate, four ferrite tube inductors mounted in said plate and oriented along orthogonal coodinates therein, two permanent magnets, each mounted on one side of said plate and coupled for limited movement with respect to said plate with opposite poles of said magnets in magnetic interaction with each other and with said ferrite tube inductors, positional means coupled to said magnets to change the orthogonal position of said magnets relative to said ferrite tube inductors to change the relative amount of magnetic flux reaching each of said ferrite tube inductors in dependence upon the orthogonal position of said positional means, means coupled to said ferrit tube inductors for producing output signals indicative of the orthogonal position of said positional means, electronic means coupled to receive said output signals and producing a further signal for functional control of equipment along orthogonal coordinates.

* * * * *